United States Patent
Sargaison

(10) Patent No.: US 8,433,555 B2
(45) Date of Patent: *Apr. 30, 2013

(54) PROCESSOR EMULATION USING FRAGMENT LEVEL TRANSLATION

(75) Inventor: Stewart Sargaison, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,394

(22) Filed: Nov. 14, 2011

(65) Prior Publication Data

US 2012/0059643 A1 Mar. 8, 2012

Related U.S. Application Data

(63) Continuation of application No. 12/331,349, filed on Dec. 9, 2008, now Pat. No. 8,060,356.

(60) Provisional application No. 61/015,152, filed on Dec. 19, 2007.

(51) Int. Cl.
- G06F 9/455 (2006.01)
- G06F 9/45 (2006.01)
- G06F 9/26 (2006.01)
- G06F 9/34 (2006.01)

(52) U.S. Cl.
USPC .............. 703/26; 703/23; 717/138; 711/202

(58) Field of Classification Search .................. 703/26, 703/28, 23; 717/138
See application file for complete search history.

(56) References Cited

U.S. PATENT DOCUMENTS

| | | | |
|---|---|---|---|
| 4,587,612 A | 5/1986 | Fisk et al. | |
| 4,791,558 A | 12/1988 | Chaitin et al. | |
| 5,546,552 A | 8/1996 | Coon et al. | |
| 5,551,015 A | 8/1996 | Goettelmann et al. | |
| 5,560,013 A | 9/1996 | Scalzi et al. | |
| 5,574,927 A * | 11/1996 | Scantlin | 712/41 |
| 5,649,203 A | 7/1997 | Sites | |
| 5,682,328 A | 10/1997 | Roeber | |
| 5,751,982 A | 5/1998 | Morley | |
| 5,768,593 A | 6/1998 | Walters et al. | |

(Continued)

FOREIGN PATENT DOCUMENTS

| | | |
|---|---|---|
| EP | 0945796 | 9/1999 |
| WO | WO2007096602 | 8/2007 |

OTHER PUBLICATIONS

Office Action dated Nov. 13, 2008 issued for U.S. Appl. No. 11/700,448.
Office Action dated Dec. 23, 2009 issued for U.S. Appl. No. 11/696,691.
Office Action dated Sep. 14, 2009 issued for U.S. Appl. No. 11/696,699.
Office Action dated Mar. 17, 2009 for U.S. Appl. No. 11/696,691.
Office Action dated Sep. 17, 2008 issued for U.S. Appl. No. 11/696,691.

(Continued)

*Primary Examiner* — David Silver
*Assistant Examiner* — Cedric D Johnson
(74) *Attorney, Agent, or Firm* — Joshua D. Isenberg; JDI Patent

(57) ABSTRACT

Emulation of a target system with a host system is disclosed. Two or more target system code instructions may be grouped into one or more fragments. A main translation function may be implemented by translating each fragment into a corresponding set of position-independent instructions executable by the host system. A target processor may be emulated by executing the corresponding set of position-independent executable instructions with the host system.

13 Claims, 4 Drawing Sheets

U.S. PATENT DOCUMENTS

| | | | |
|---|---|---|---|
| 5,790,825 | A | 8/1998 | Traut |
| 5,815,720 | A | 9/1998 | Buzbee |
| 6,016,542 | A | 1/2000 | Gottlieb et al. |
| 6,031,992 | A | 2/2000 | Cmelik et al. |
| 6,047,381 | A | 4/2000 | Klein |
| 6,115,054 | A | 9/2000 | Giles |
| 6,142,682 | A | 11/2000 | Skogby |
| 6,151,670 | A | 11/2000 | Lange et al. |
| 6,158,047 | A | 12/2000 | Le et al. |
| 6,247,172 | B1 | 6/2001 | Dunn et al. |
| 6,314,560 | B1 | 11/2001 | Dunn et al. |
| 6,327,704 | B1 | 12/2001 | Mattson et al. |
| 6,332,214 | B1 | 12/2001 | Wu |
| 6,397,242 | B1 | 5/2002 | Devine et al. |
| 6,463,582 | B1 | 10/2002 | Lethin et al. |
| 6,502,237 | B1 | 12/2002 | Yates et al. |
| 6,529,862 | B1 | 3/2003 | Mann et al. |
| 6,532,532 | B1 | 3/2003 | Eaton et al. |
| 6,631,514 | B1 | 10/2003 | Le |
| 6,672,963 | B1 | 1/2004 | Link |
| 6,704,925 | B1 | 3/2004 | Bugnion |
| 6,728,950 | B2 | 4/2004 | Davis et al. |
| 6,763,328 | B1 | 7/2004 | Egolf et al. |
| 6,884,171 | B2 | 4/2005 | Eck et al. |
| 6,993,751 | B2 | 1/2006 | Bhansali et al. |
| 7,000,226 | B2 | 2/2006 | Gao et al. |
| 7,096,460 | B1 | 8/2006 | Banning et al. |
| 7,100,023 | B2 | 8/2006 | Magoshi |
| 7,107,580 | B2 | 9/2006 | Zemach et al. |
| 7,111,096 | B1 | 9/2006 | Banning et al. |
| 7,117,143 | B2 | 10/2006 | Wang et al. |
| 7,181,601 | B2 | 2/2007 | Rudd et al. |
| 7,210,144 | B2 | 4/2007 | Traut |
| 7,260,815 | B1 | 8/2007 | Chen et al. |
| 7,418,580 | B1 | 8/2008 | Campbell et al. |
| 7,624,384 | B2 | 11/2009 | Zhang et al. |
| 7,644,210 | B1 | 1/2010 | Banning et al. |
| 7,770,050 | B2 | 8/2010 | Sargaison et al. |
| 7,792,666 | B2 | 9/2010 | Sargaison et al. |
| 8,060,356 | B2 | 11/2011 | Sargaison |
| 2002/0052727 | A1* | 5/2002 | Bond et al. ............ 703/26 |
| 2002/0066086 | A1 | 5/2002 | Linden |
| 2002/0156977 | A1 | 10/2002 | Derrick et al. |
| 2003/0093649 | A1 | 5/2003 | Hilton |
| 2003/0093774 | A1 | 5/2003 | Hilton |
| 2003/0093775 | A1 | 5/2003 | Hilton |
| 2003/0093776 | A1 | 5/2003 | Hilton |
| 2003/0101439 | A1 | 5/2003 | Desoli et al. |
| 2004/0054993 | A1* | 3/2004 | Nair et al. ............ 717/138 |
| 2004/0158681 | A1 | 8/2004 | Hooker |
| 2004/0205733 | A1 | 10/2004 | Souloglou et al. |
| 2004/0221273 | A1 | 11/2004 | Sandham et al. |
| 2004/0221278 | A1 | 11/2004 | Dankel et al. |
| 2005/0015754 | A1 | 1/2005 | Werner et al. |
| 2005/0015756 | A1 | 1/2005 | Brown et al. |
| 2005/0015758 | A1 | 1/2005 | North |
| 2005/0149697 | A1 | 7/2005 | Enright et al. |
| 2006/0029234 | A1 | 2/2006 | Sargaison |
| 2006/0114132 | A1 | 6/2006 | Zhang et al. |
| 2007/0180438 | A1 | 8/2007 | Suba |
| 2007/0260446 | A1 | 11/2007 | Suba et al. |
| 2007/0261039 | A1 | 11/2007 | Sargaison et al. |
| 2007/0277052 | A1 | 11/2007 | Sargaison et al. |
| 2008/0040093 | A1 | 2/2008 | Sargaison et al. |
| 2008/0052691 | A1 | 2/2008 | Neelakantam et al. |
| 2008/0092151 | A1 | 4/2008 | Brown |
| 2009/0164205 | A1 | 6/2009 | Sargaison |

OTHER PUBLICATIONS

Final Office Action dated Mar. 17, 2009 issued for U.S. Appl. No. 11/696,691.

Office Action dated Oct. 6, 2009 issued for U.S. Appl. No. 11/696,684.

Office Action dated Nov. 13, 2008 issued for U.S. Appl. No. 11/700,488.

Advisory Action dated Jun. 1, 2009 issued for U.S. Appl. No. 11/696,691.

Notice of Allowance and Fee(s) Due dated Apr. 21, 2009 issued for U.S. Appl. No. 11/700,448.

Notice of Allowance and Fee(s) Due dated Apr. 12, 2010 for U.S. Appl. No. 11/696,684.

Notice of Allowance and Fee(s) Due dated Mar. 25, 2010 for U.S. Appl. No. 11/696,699.

Notice of Allowance dated May 14, 2010 issued for U.S. Appl. No. 11/696,691.

Office Action dated Apr. 8, 2011 issued for U.S. Appl. No. 12/331,349.

Notice of Allowance dated Sep. 6, 2011 issued for U.S. Appl. No. 13/331,349.

European Search Report for European Application No. 07761060 (International application No. PCT/US2007/067142) dated Mar. 30, 2009, 8 pages.

European Search Report for European Application No. 07761064 (International application No. PCT/US2007/067146) dated Apr. 6, 2009, 7 pages.

International Search Report and Written Opinion of the International Search Authority—International application No. PCT/US07/67142 dated May 21, 2008.

International Search Report and Written Opinion of the International Search Authority—International application No. PCT/US07/67146 dated Jul. 30, 2008.

International Search Report and Written Opinion of the International Search Authority—International application No. PCT/US0767133 dated Feb. 21, 2008.

U.S. Appl. No. 12/834,756 filed Jul. 12, 2010.

U.S. Appl. No. 11/696,691, to Stewart Sargaison et al., entitled "Register Mapping in Emulation a Target System on a Host System" filed Apr. 4, 2007.

U.S. Appl. No. 60/746,267, to Stewart Sargaison et al., entitled "Translation Block Invalidation Prehints in Emulation of a Target System on Host System", filed May 3, 2006.

U.S. Appl. No. 60/746,268, to Stewart Sargaison et al., entitled "Register Mapping in Emulation a Target System on a Host System" filed May 3, 2006.

U.S. Appl. No. 60/746,273, entitled "Method and Apparatus for Resolving Clock Management Issues in the Emulation Involving Both Interpreted and Translated Code" filed May 3, 2006.

U.S. Appl. No. 60/763,568, to Victor Suba et al., entitled "Branch Prediction Thread Management" filed Jan. 30, 2006.

U.S. Appl. No. 60/797,435, to Victor Suba et al., entitled "DMA and Graphics Interface Emulation" filed May 3, 2006.

U.S. Appl. No. 60/797,761, to Victor Suba et al., entitled "Code Translation and Pipeline Optimization" filed May 3, 2006.

U.S. Appl. No. 60/797,762, to Victor Suba et al., entitled "Stall Prediction" filed May 3, 2006.

U.S. Appl. No. 60/912,573, to Victor Suba Miura, entitled "Processor Emulation Using Speculative Forward Translation" filed Apr. 18, 2007.

U.S. Appl. No. 60/015,152, to Stewart Sargaison, entitled "Processor Emulation Using Fragment Level Translation" filed Dec. 19, 2007.

"Energy-Efficient Designed", Kunio Uchiyama, 2005 IEEE.

Eichenberger, A. E. et al.—Optimizing Complier for a Cell Processor, 2005, IEEE, 12 pages.

McNairy, C. et al.—Montecio: A Dual-Core, Dual Thread Itanium Processor, 2005, IEEE, pp. 10-20.

Proebsting T. et al.: "Probabilistic Register Allocation", ACM SIGPLAN Notices, vol. 7, No. 7, Jul. 1, 1992, pp. 300-310.

Smelyanskiy M. et al.: "Register Queues: A New Hardware/Software Approach to Efficient Software Pipelining"—IEEE, 2000, pp. 3-12.

Wang. ISSCC 2005—"The CELL Microprocessor Real World Technologies", Feb. 2005, pp. 1-9.

Zhu et al. "A Retargetable, Ultra-fast Instruction set Simulator.", 1999.

Kumar, Naveen et al.,"Compile-Time Planning for Overhead Reduction in Software Dynamic Translator", Jun. 2005, International Journal of Parallel Programming, vol. 33, Nos. 213.

\* cited by examiner

US 8,433,555 B2

PROCESSOR EMULATION USING FRAGMENT LEVEL TRANSLATION

CLAIM OF PRIORITY

This application claims the priority benefit of commonly-assigned, U.S. Provisional Patent application No. 61/015,152 to Stewart Sargaison entitled "PROCESSOR EMULATION USING FRAGMENT LEVEL TRANSLATION", filed Dec. 19, 2007, the entire disclosures of which are incorporated herein by reference.

This application is a continuation of and claims the priority benefit of commonly-assigned, U.S. patent application Ser. No. 12/331,349 to Stewart Sargaison entitled "PROCESSOR EMULATION USING FRAGMENT LEVEL TRANSLATION", filed Dec. 9, 2008, which issued on Nov. 15, 2011 as U.S. Pat. No. 8,060,356 B2,the entire disclosures of which are incorporated herein by reference.

CROSS-REFERENCE TO RELATED APPLICATION

This application is related to U.S. provisional application No. 60/912,573, to Victor Suba Miura, entitled PROCESSOR EMULATION USING SPECULATIVE FORWARD TRANSLATION, filed Apr. 18, 2007, the entire disclosures of which are incorporated herein by reference. This application is related to U.S. provisional application No. 60/746,267, to Stewart Sargaison et al, entitled TRANSLATION BLOCK INVALIDATION PREHINTS IN EMULATION OF A TARGET SYSTEM ON A HOST SYSTEM, filed May 3, 2006, the entire disclosures of which are incorporated herein by reference. This application is related to U.S. provisional application No. 60/746,268, to Stewart Sargaison et al, entitled REGISTER MAPPING IN EMULATION A TARGET SYSTEM ON A HOST SYSTEM, filed May 3, 2006, the entire disclosures of which are incorporated herein by reference. This application is related to U.S. provisional application No. 60/746,273 METHOD AND APPARATUS FOR RESOLVING CLOCK MANAGEMENT ISSUES IN EMULATION INVOLVING BOTH INTERPRETED AND TRANSLATED CODE, filed May 3, 2006, the entire disclosures of which are incorporated herein by reference. This application is related to U.S. provisional application No. 60/797,762, to Victor Suba, entitled STALL PREDICTION THREAD MANAGEMENT, filed May 3, 2006, the entire disclosures of which are incorporated herein by reference. This application is related to U.S. provisional application No. 60/797,435, to Stewart Sargaison et al, entitled DMA AND GRAPHICS INTERFACE EMULATION, filed May 3, 2006, the entire disclosures of which are incorporated herein by reference. This application is also is related to U.S. provisional application No. 60/797,761, to Stewart Sargaison et al, entitled CODE TRANSLATION AND PIPELINE OPTIMIZATION, filed May 3, 2006, the entire disclosures of which are incorporated herein by reference.

This application is related to U.S. patent application Ser. No. 11/700,448, filed Jan. 30, 2007, which claims the benefit of priority of U.S. provisional patent application No. 60/763,568 filed Jan. 30, 2006. Application Ser. No. 11/700,448 was issued as U.S. Pat. No. 7,577,862 B2 on Aug. 18, 2009. The entire disclosures of application Ser. Nos. 11/700,448 and 60/763,568 and U.S. Pat. No. 7,577,826 B2 are incorporated herein by reference.

This application is related to commonly-assigned, co-pending application Ser. No. 11/696,684, to Stewart Sargaison et al, entitled TRANSLATION BLOCK INVALIDATION PREHINTS IN EMULATION OF A TARGET SYSTEM ON A HOST SYSTEM, filed Apr. 4, 2007, which issued as U.S. Pat. No. 7,792,666 B2 on Sep. 7, 2010, the entire disclosures of which are incorporated herein by reference. This application is related to commonly-assigned, co-pending application Ser. No. 11/696,691, to Stewart Sargaison et al, entitled REGISTER MAPPING IN EMULATION A TARGET SYSTEM ON A HOST SYSTEM, filed Apr. 4, 2007, which issued as U.S. Pat. No. 7,813,909 B2 on Oct. 12, 2010, the entire disclosures of which are incorporated herein by reference. This application is related to commonly-assigned, co-pending application Ser. No. 11/696,699, to Stewart Sargaison et al, entitled METHOD AND APPARATUS FOR RESOLVING CLOCK MANAGEMENT ISSUES IN EMULATION INVOLVING BOTH INTERPRETED AND TRANSLATED CODE, filed Apr. 4, 2007, which issued as U.S. Pat. No. 7,770,050 B2 on Aug. 3, 2010, the entire disclosures of which are incorporated herein by reference.

FIELD OF THE INVENTION

Embodiments of this invention relate to emulation of a target computer platform on a host computer platform and more particularly to runtime software translation as used in emulation of a target architecture onto a host architecture by use of speculative forward translation.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via interpretation than when the equivalent program is recompiled into target machine code and the target code version is executed. Due to the well known slowness of software emulation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Some runtime translation systems use a method known as Just In Time (JIT) translation to translate target software into host software on an as-needed basis. Examples emulation employing JIT translation schemes are described, e.g., in U.S. patent applications Ser. Nos. 11/696,684, 11/696,691 and 11/696,699, which have been incorporated by reference above. Such a runtime JIT scheme is often used in translating target software of a dynamic nature. In software that is dynamic in nature, portions of code may change dynamically prior to execution. For example, within the target system, executable code may change dynamically through the loading of new executables, loading of overlays, runtime code generation or self-modifying code. Dynamic code changes may also occur by modifying memory through a number of pathways such as by executing system calls, via direct memory access (DMA) transfers from various devices, or simply by executing user code.

One of the problems of JIT translation is that the translation is performed on an as needed basis, at a point where the target software can no longer continue executing without further translation. If the underlying target system code is dynamic, the entire load of software translation may be placed onto the critical execution path of the software. Within a real time system this may cause an undesired execution slowdown when the translation load peaks. This can be particularly problematic when emulating a system where the target system being emulated is a main CPU with an attached digital signal processor (DSP) or DSP-like processor with a separate instruction memory.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention.

Embodiments of the invention are directed to a method and apparatus for improving execution performance within the area of runtime software translation as used in emulation of a target architecture on a host architecture by use of fragment level translation.

Embodiments of the present invention are particularly applicable where the architecture of the target system being emulated includes a main CPU with an attached secondary processor, such as a digital signal processor (DSP) or DSP-like processor having a separate instruction memory. In some embodiments, the host system includes a main CPU and one or more secondary processor elements with attached local memory. Fragment-level translation in accordance with embodiments of the present invention may be more broadly applicable to emulation of other target system architectures, such as graphics processor unit (GPU) architectures.

Embodiments of the present invention solve the problem of maintaining performance in an environment where the main CPU sends multiple programs to be run on the secondary processor. Depending on the complexities of the secondary processor instruction set, translating code may be a time-expensive operation. Therefore it is often desirable to avoid re-translating already translated code wherever possible. For example, if a given instruction sequence is loaded to different addresses. Also both for performance and memory reasons (the host system secondary processor elements may have a limited amount of local memory), it is important to avoid generating unnecessary code, e.g., for results that are not used in the course of program execution.

According to embodiments of the invention efficient emulation may be performed by splitting the emulation task into three pieces: (a) instruction memory emulation; (b) the main translation function; and (c) target system secondary processor emulation. By way of example, instruction memory emulation may be performed by one host system secondary processor element, target system secondary processor emulation may be performed by another host system secondary processor element, and the main translation function may be performed by the host system CPU. This allows a very high degree of parallelism and efficient usage of resources.

Figure 1:
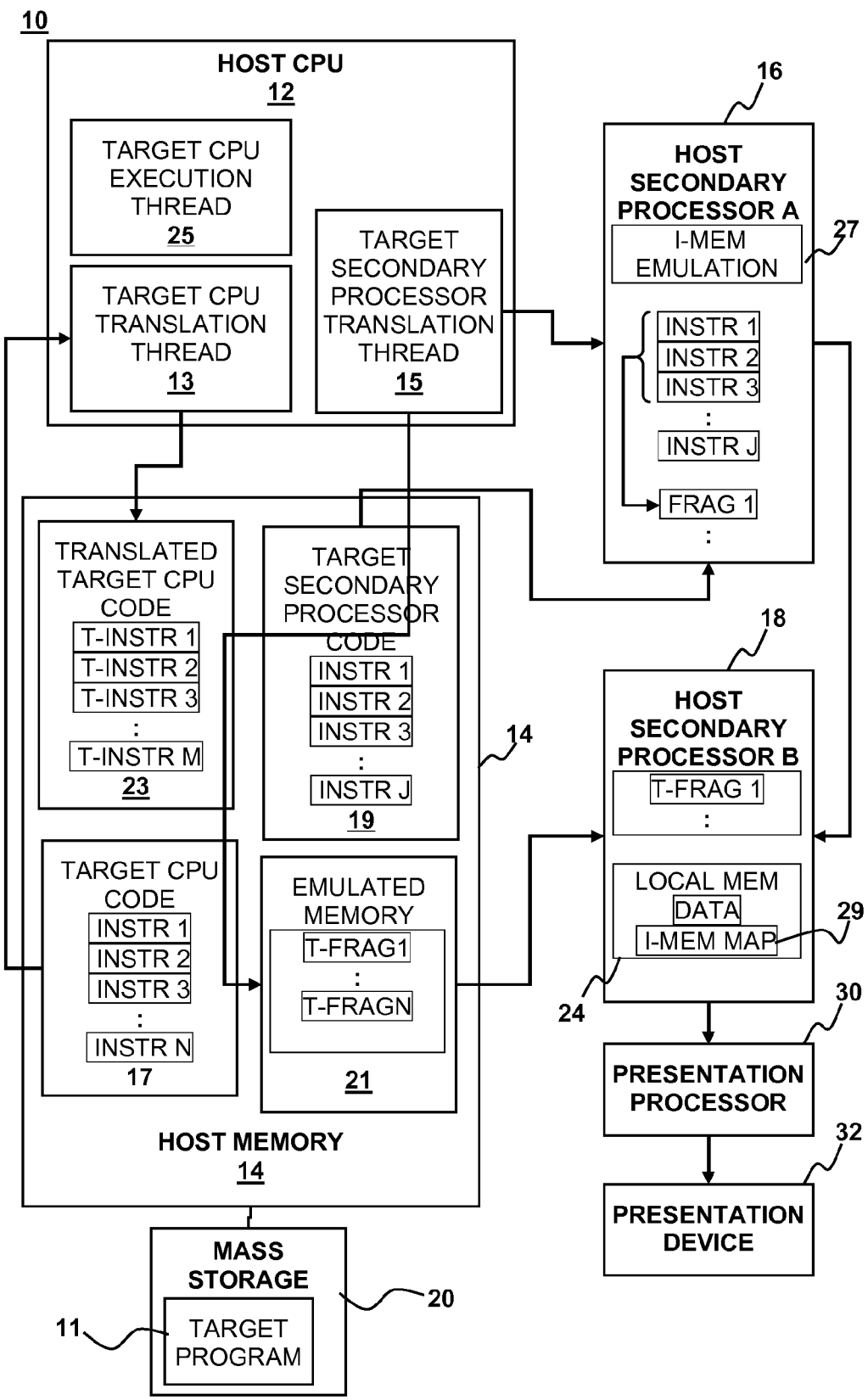
FIG. 1 is a block diagram of a system implementing fragment-level translation according to an embodiment of the present invention.
Figure 2:
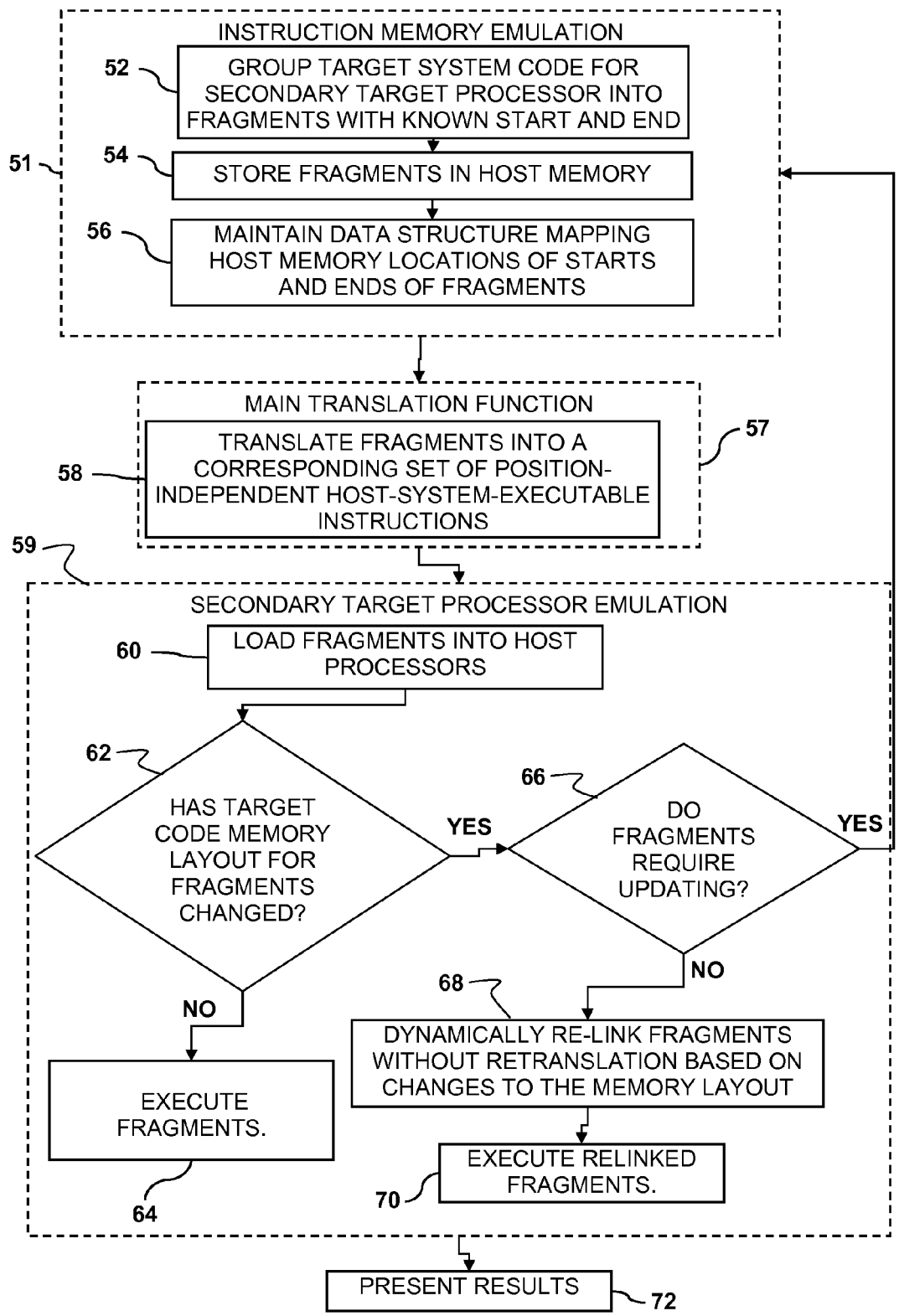
FIG. 2 is a flow diagram of a fragment-level translation method according to an embodiment of the present invention.

Embodiments of the invention may be understood by referring to FIG. 1 and FIG. 2 simultaneously. FIG. 1 is a block diagram of a host system 10 configured to implement fragment-level translation according to an embodiment of the present invention. FIG. 2 is a flow diagram illustrating emulation of a target program 11 on the host system 10 using fragment-level translation according to an embodiment of the present invention. By way of example, the host system 10 may generally include a central processing unit (CPU) 12, a memory 14, and first and second secondary processors 16, 18. The host system 10 may optionally include a mass storage device 20, such as a CD-ROM drive, hard disk, flash memory and the like. These components 10 may be coupled to each other such that they can exchange data and/or processor-executable code with each other.

The target program 11 may be stored in the mass storage device. The target program is configured (e.g., by suitable programming) to run on a target system having a main processor (referred to herein as the target CPU) and a secondary processor, e.g., a DSP or DSP-like processor, having a separate instruction memory. Preferably, the target secondary processor is of a type that cannot modify its own instruction memory. Changes to the instruction memory may result from loading of new instructions and/or removal of others by the target system CPU. Thus, changes to the instruction memory may be tracked by tracking the writing of instructions to the instruction memory by the CPU or other processors associated with the target system.

To execute the target program 11 on the host system 10, the CPU 12 may be programmed with a target CPU translation thread 13 and a target secondary processor translation thread 15. Target CPU code instructions 17, target secondary processor instructions 19 and emulated memory 21 associated with the target program 11 may be stored temporarily in the host memory 14. The target CPU translation thread 13 takes the target CPU code instructions 17 and translates them to generate translated target CPU code 23, which may be temporarily stored in the host memory 14 pending execution by the host CPU 12, e.g., using an execution thread 25.

The secondary processor translation thread 15 receives the target secondary processor instructions 19 and translates them on a fragment-by-fragment basis. Specifically, as seen from the flow diagram of FIG. 2, the secondary processor translation thread 15 may group two or more instructions INSTR1 . . . INSTRJ of target system secondary processor code 19 into one or fragments FRAG1 . . . FRAGN. Each fragment has a known starting point and ending point.

By way of example, the first host secondary processor 16 may group the instructions INSTR1 . . . INSTRJ by executing a microprogram instruction of the type: MPG [S, NUM], which transfer a number NUM instructions starting at address S.

By way of example one may start with an "empty" fragment, i.e., one containing no target system MPG commands. As target system MPG commands arrive they may be merged together until an incoming MPG command doesn't touch the existing fragment, OR the secondary processor receives a RUN command (MSCAL)

For example, suppose the secondary processor translation thread 15 include the following target system MPG commands:
MPGa(10,5)—write 5 instructions starting at location 10
MPGb(13,10)—write 10 instructions starting at location 13
MPGc(3,10)—write 10 instructions starting at location 3
MPGd(200,5)—write 5 instructions starting at location 200
MPGe(205,10)—write 10 instructions starting at location 205
MSCAL→start the secondary processor running MPG commands MPGa through MPGc may be grouped together as one for memory location 3 to 23 and commands MPGd and MPGe may be grouped together as a second fragment for memory location 200 to 215.

In summary, overlapping input commands may be gathered together into fragments. When a gap appears in a command sequence (or a program run command happens) the gathering operation may end.

In the target system, these instructions may be written into an emulated instruction memory 27 for the target system secondary processor. The first host secondary processor 16 may execute code that analyzes the instructions as they are written to emulated instruction memory 27. As shown in FIG. 2, a set of instruction memory emulation instructions 51 may be implemented, e.g., by the first host secondary processor 16. Sequences of contiguous instructions, e.g., instructions having no branches may then be grouped together to form the fragments FRAG1 . . . FRAGN as indicated at 52. The fragments may be stored in the host memory 14 as indicated at 54. The second host secondary processor 18 may keep track of the memory locations of the fragments 24, e.g., by updating a data structure 29 mapping host memory locations of the starts and ends of the fragments FRAG1 . . . FRAGN as indicated at 56 in FIG. 2. A set of main translation instructions 57 may then be implemented. For example, the target secondary processor emulation thread 15 may then translate the fragments into host system code on a fragment-by-fragment basis as indicated at 58 in FIG. 2 to form translated fragments T-FRAG1 . . . T-FRAGN, which may be temporarily stored in host memory 14. The translated fragments T-FRAG1 . . . T-FRAGN may then be utilized by a set of secondary target processor emulation instructions 59. It is noted that in embodiments of the invention the emulated instruction memory 27 may be uncoupled from the emulation of the target secondary processor that executes the instructions.

Uncoupling the emulation of the emulated instruction memory from emulation of the target secondary processor allows for a more parallelism, particularly where the secondary processor has a limited amount of available local store space.

Specifically, the second host secondary processor 18 may be configured to load the translated fragments T-FRAG1 . . . T-FRAGN from host memory 14, as indicated at 60 in FIG. 2, and subsequently execute them. Alternatively, the translated fragments T-FRAG1 . . . T-FRAGN may be stored elsewhere. It is noted that the translated fragments are cached. Therefore, they may be stored at any location with a suitable amount (e.g., about 16 Megabytes) of Random Access Memory RAM.

It is noted that the translated fragments T-FRAG1 . . . T-FRAGN specify what the host system secondary processor should do when the emulated target system secondary processor program counter tries to execute an instruction inside it. Typically, the default 'translation' of a fragment (created when a host system secondary processor first sees the fragment) is equivalent to "stop and ask the CPU 12 to translate this". In that sense, all translations may be directly loaded into the local storage of a host system secondary processor when initially translated.

As noted above, the target system being emulated by the host system 10 may execute dynamic code, which may change during the course of execution. Such code changes may alter the memory layout of the target secondary processor code 19. In embodiments of the invention, the host system 10 may check to determine, as indicated at 62 in FIG. 2, whether the memory layout for the target secondary processor code 19 has changed. For example, the second host secondary processor 18 may periodically subject the fragments FRAG1 . . . FRAGN to a checksum to determine if there have been any changes to the underlying target system code 19. For example, a checksum may be performed on the data in commands MPGa, MPGb and MPGc that make up the first fragment in the example cited above. The checksum may be reversible in the sense that if an entry inside a fragment has been changed one can undo the previous change and then insert a new one. The checksum may operate, e.g., by performing an exclusive or (XOR) operation on some small number of entries (e.g., five) and an add operation, which may be reversed by doing a subtract operation.

If the memory layout has not changed, the second host secondary processor 18 may execute the translated fragments T-FRAG1 . . . T-FRAGN, e.g., as indicated at 64 of FIG. 2. If the memory layout has been changed the second host secondary processor 18 may determine at runtime whether the translated fragments T-FRAG1 . . . TFRAGN need to be updated, as indicated at 66. Not all changes to the memory layout necessitate retranslation of the underlying target system code fragments FRAG1 . . . FRAGN. For example, changes that only result in a target system instruction being moved to a different address need not result in retranslation of the fragment. In such a case, the information about the memory layout may be used to reload and dynamically re-link the translated fragments T-FRAG1 . . . TFRAGN as indicated at 68. The re-linking of the translated fragments may be performed in parallel with retrieval of data from host memory 14 for use by the second host secondary processor 18. Once they have been re-linked, the second host secondary processor 18 may execute the re-linked fragments as indicated at 70. If the fragments FRAG1 . . . FRAGN have been altered to the point that they do require re-translation, the fragments may be re-translated, as indicated by the return to block 56 in FIG. 2. The re-translation may be implemented by invoking the target secondary processor translation thread 15.

Execution of the translated or re-linked or retranslated secondary target processor instructions with the second secondary processor 18 may lead to a result being presented as indicated at 72. For example, data and or instructions generated by the secondary processor 18 may be sent to a presentation processor 30 that drives a presentation device 32. By way of example, and without loss of generality, the presentation device 32 may be a graphical display device, such as a cathode ray tube (CRT) or flat panel display. In such a case, the presentation processor may be a graphics processor of a type commonly used in conjunction with such graphical display devices. Alternatively, the presentation device 32 may be an audio speaker, in which case, the presentation processor 30 may be an audio processor.

Figure 3A:
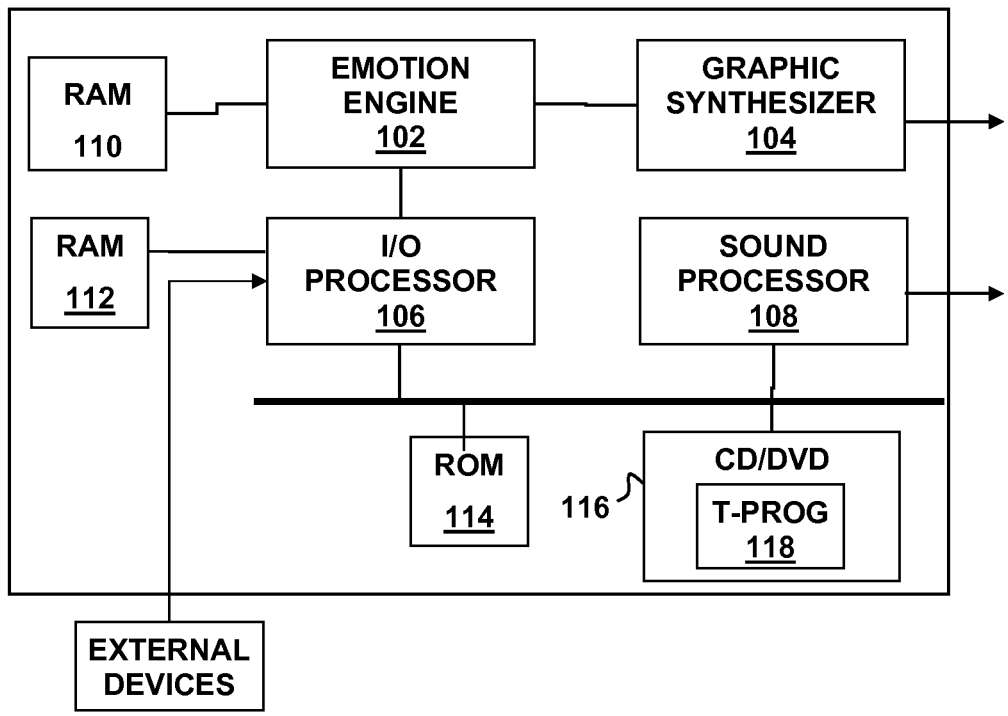
FIG. 3A is a block diagram of an example of a target device that may be emulated using fragment-level translation according to an embodiment of the present invention.

Embodiments of the present invention may be used in emulation of any target system having a secondary processor that cannot modify its own instruction memory. Target systems include, but are not limited to general purpose computer systems and other programmable devices, such as video game console devices. By way of example FIG. 3A depicts a block diagram of an example of a target system 100 in the form of a game console device, a Sony Playstation®2. PlayStation is a registered trademark of Sony Computer Entertainment Inc. of Tokyo, Japan. In this example, the target system 100 is built around a main processor module 102 referred to as an emotion engine, a Graphic Synthesizer 104, an input/output (I/O) processor (IOP) 106 and a sound processor unit 108. The emotion engine 102 typically includes a CPU core, co-processors and a system clock and has an associated random access memory (RAM) 110. The emotion engine 102 may perform animation calculation, traverse a scene and convert it to a two-dimensional image that may be sent to the Graphic Synthesizer (GS) 104 for rasterization.

Figure 3B:
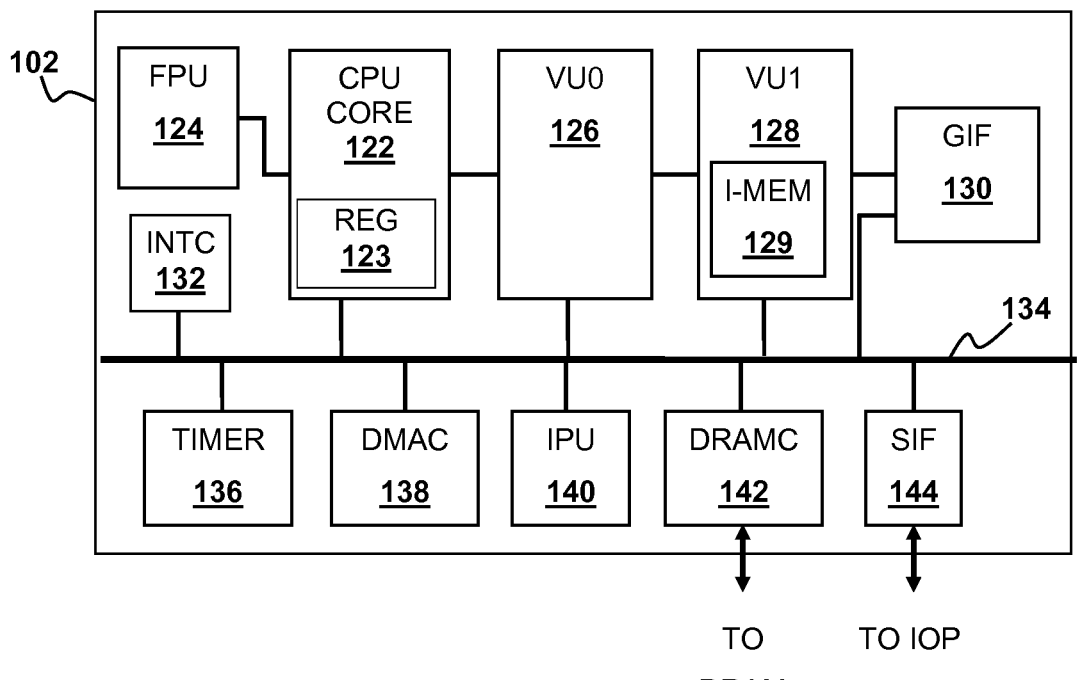
FIG. 3B is a block diagram of an emotion engine of the target device of FIG. 3A.

As shown in FIG. 3B, the EE 102 may include a CPU core 122, with an associated floating point unit (FPU) coprocessor 124, first and second vector co-processors 126, 128, a graphics interface controller 130 and an interrupt controller (INTC) 132. The CPU 122, vector co-processors 126, 128, GIF 130 and INTC 132 may be coupled to a 128-bit main bus 134. The FPU 124 may be directly coupled to the CPU 122. The CPU 122 may be coupled to a first vector co-processor (VU0) 126, which is, in turn, may be coupled to a second vector co-processor (VU1) 128, having an instruction memory 129. VU1 128 is an example of a secondary processor that cannot modify its own instruction memory 129. The second vector co-processor VU1 128 may be coupled to a graphics interface (GIF) 130. The EE 102 additional may include a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. These instructions may be handled using 128-bit registers 123. The CPU 122 may include a data cache, an instruction cache and an area of on-chip memory sometimes referred to as a scratchpad. The scratchpad serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 may serve as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 108 or IOP RAM 112 and executed by the various processors of the target system 100 in a native machine code that can be read by these processors.

Figure 4:
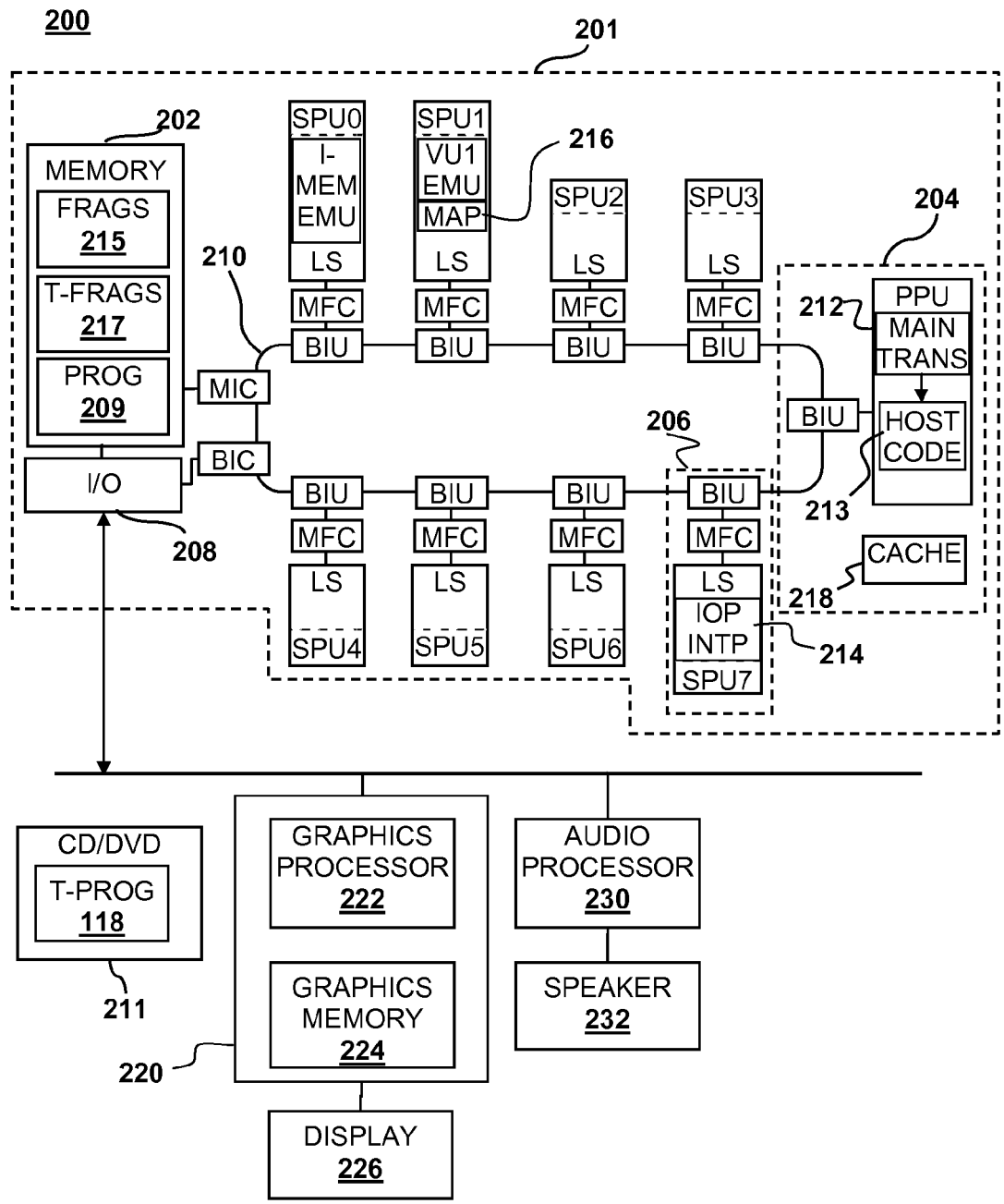
FIG. 4 is a schematic diagram of an example of a host device that may emulate the target device of FIGS. 3A-3B according to an embodiment of the present invention.

In embodiments of the present invention, the target system 100 may be emulated using a parallel processing host system 200 so that the host system 200 can run programs written in code native to the target system 100 such as target program 118. FIG. 4 depicts an example of a host system 200 based on a cell processor 201 that may be configured to emulate the target system 100. An example of a cell processor is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The cell processor 201 may include a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 may communicate with each other and with an I/O device 208 over a ring-type element interconnect bus (EIB) 210. The I/O device 208 may communicate with the EIB 210 via a bus interface controller (BIC). The PPE 204 and SPEs 206 can access the EIB 210 through bus interface units (BIU). The PPE 204 and SPEs 206 can access the main memory 202 over the EIB 210 through memory flow controllers (MFC).

The main memory 202 may interface with the EIB 210 via a memory interface controller (MIC). The memory 202 may contain an emulation program 209 that implements interpretation and translation of coded instructions written for the target system 100. The coded target system instructions may be read from a CD/ROM disc in a CD/DVD reader 211 coupled to the I/O device 208. A CD/ROM disc containing the target program 118 may be loaded into the CD/DVD reader 211. The emulation program 209 may implement fragment-level translation as described above with respect to FIG. 1 and FIG. 2. Specifically, the emulation program 209 may include a translation threads 212 translate code for the CPU core 122 and VU1 128 and an EE emulation thread 213 that emulates the EE 102. The translation thread 212 and EE emulation thread 213 may run on the PPU. The translation threads 212 may include a thread that emulates the EE 102 of the target system 100 by translating EE instructions of the target program 118 into translated code 213 that can be run on the PPE 204. In certain embodiments of the invention a dedicated SPE 206 may implement a software interpreter 214 that emulates the IOP 106 by interpreting IOP instructions of the target program 118.

One of the SPE 206 (referred to herein as SPU0) may implement instructions configured to emulate the instruction memory 129 of VU1 128. In particular SPU0 may be programmed to manage DMA for the system and emulates the external interface to VU1, known as the VIF. DMA may also be done by writing external commands. SPU0 analyzes the command stream on the VIF. SPU0 may analyze the target code instructions for VU1 128 and group them into fragments 215 to be translated by the PPU. Another SPU 206, referred to herein as SPU1 may be programmed with instructions for emulating VU1 128. In particular, SPU1 may maintain a data structure 216 that describes the starts and ends of the fragments (as determined by SPU0) in its local store LS. When a program fragment load is detected by SPU0, information about the fragment and where it has been loaded (with respect to the emulated instruction memory 129) to may be sent to SPU1. For example, when the EE 102 (as emulated by the EE emulation thread 213) writes to the instruction memory 129 associated with VU1 128, the instruction being written may be caught by a trap instruction (address fault) on the PPU and changed to write a command to SPU1. In emulating VU1 128, SPU1 only knows about program fragments 215, not individual instructions. The translation threads 212 may include a separate thread that translates the target code fragments for VU1 128 into translated fragments 217, which may be stored temporarily in the main memory 202. Alternatively the translated code fragments 217 may be temporarily stored in a cache 218 associated with the PPE 204. The translated code fragments 217 may be sent to SPU1 for execution.

In embodiments of the present invention, high performance may be achieved by maintaining a cache of program fragments that is derived from an analysis of the instructions sent to VU1 128 by the main processor as they are written into emulated memory. The analysis of the work may be performed on SPU0. These sequences may be grouped together into sequences of instructions (program fragments) that are as large as possible. Such grouping may be done, e.g., by merging adjacent or overlapping blocks. These fragments may be represented in a position-independent manner. A large reversible checksum may be used to manage overlapping fragments, e.g., as discussed above.

When previously un-executed code is to be executed by SPU1, or a jump is performed to an instruction that's not known to be an edge of a fragment (e.g., a control flow point) SPU1 may stop execution and interrupt the PPE 204 to resolve the problem. The PPE 204 may analyze the cause of the fault, find the relevant program fragment(s) that require update to resolve the fault, e.g., from fragments 215 stored in memory 202. The PPE 204 may then translate the relevant fragments and then restart SPU1 operating. In this way, if the translation of a program fragment changes over time, subsequent uses of the same instruction sequence (fragment) can benefit from the retranslation.

By way of example, consider a sequence of instructions in memory (that corresponds to a very simple 6 instruction fragment called F):

| (Address) | (Instruction) |
|---|---|
| 10 | Ia |
| 11 | Ib |
| 12 | Ic |
| 13 | Id |
| 14 | Ie |
| 15 | Branch someplace else. |

Initially all the entries for locations 10-15 in SPU1's lookup table for where to jump if they're executed all point to a location corresponding to a handler having one or more instructions equivalent to "stop+let PPE 204 translate". For example, say VU1 128 begins running at location 10, and it's the first time SPU1 has encountered this location. Then the first translation for this fragment may be a single block of SPU code that's the translation for instructions Ia, Ib, Ic, Id, Ie and the branch that make up fragment F. In other words, the generated code is rescheduled, and entry 10 in the look up table points to this first translation, entries 11-15 still point to the "stop+let PPE 204 translate" handler). If VU1 subsequently jumps to location 12, SPU1 jumps to the handler, which requests the PPE 204 to recompile. The PPE may examine the layout of the emulated VU1 memory, determine that a fault happened when VU1's program counter was 12, and finds that this corresponds to offset 2 inside fragment F. So, the translator 212 running on the PPE 204 looks at fragment F, marks offset 2 as a control flow point and recompiles the fragment so that offset 2 is a scheduling barrier. The code may then be reloaded into the SPU and the index updated so that the lookup table for location 12 now points to the 'start' of f2.

It is noted that reusing fragments in this manner allows faults to be resolved without having to store two or more different translations of a fragment, e.g., one from memory locations 10-15 and one from memory locations 12-15. This may be particularly advantageous for secondary processors that have a limited amount of local storage available for multiple translations of the same fragment.

Execution of the translated fragments 217 by SPU1 (including translated fragments that have been re-linked) may result in an output that may be presented on a presentation device associated with the system 200. By way of example, the system may include a graphics subsystem 220 coupled to a graphics display 226. In addition, the system 200 may also include an audio processor 230 coupled to a speaker 232. The audio processor 230 may be adapted to generate analog or digital audio output from instructions and/or data provided by the PPE 204, SPEs 206 (including SPU1), memory 202, and/or storage device 211.

The graphics subsystem 220 may include a graphics processing unit (GPU) 222 and graphics memory 224. The graphics subsystem 220 may periodically output pixel data for an image from the graphics memory 224 to be displayed on the display device 226. The display device 226 may be any device capable of displaying visual information in response to a signal from the system 200, including CRT, LCD, plasma, and OLED displays. The graphics subsystem 220 may provide the display device 226 with an analog or digital signal. By way of example, the display device 226 may include a cathode ray tube (CRT) or flat panel screen that displays text, numerals, graphical symbols or images. The graphics memory 224 may include a display memory (e.g., a frame buffer) used for storing pixel data for each pixel of an output image. The graphics memory 224 may be integrated in the same device as the GPU 222, connected as a separate device with GPU 222, and/or implemented within the memory 202. Pixel data may be provided to the graphics memory 224 directly from the PPE 204 and or SPEs 206 including SPU1. Alternatively, the PPE 204 and/or SPEs 206 may provide the GPU 222 with data and/or instructions defining the desired output images, from which the GPU 222 may generate the pixel data of one or more output images. The data and/or instructions defining the desired output images may be stored in memory 202 and/or graphics memory 224. In an embodiment, the GPU 222 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 222 may further include one or more programmable execution units capable of executing shader programs.

Embodiments of the invention provide a simple yet effective solution to performance problems due to large translation loads associated with emulation using JIT translation.

It is noted that in the above examples, the instruction memory emulation, main translation and secondary processor emulation functions are described as being implemented by different processors. This is not meant to be a strict limitation applicable to all embodiments of the invention. Alternatively, these three functions may be implemented using any number of processors, even a single processor, e.g., through appropriately configured multi-threaded operation.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for emulating a target system with a host system, comprising:
   grouping two or more target system code instructions into one or more fragments;
   implementing a main translation function by translating each fragment into a corresponding set of position-independent instructions executable by the host system determining if a memory layout for target system code corresponding to the one or more fragments has changed, dynamically re-linking the one or more fragments without retranslating the one or more fragments based on changes to the memory layout to produce one or more re-linked fragments; and
   emulating the target system with the host system by executing the corresponding set of position-independent executable instructions with the host system wherein executing the corresponding set of position-independent executable instructions includes executing the re-linked fragments with the host system.

2. The method of claim 1 wherein the target system includes a processor of a type that is unable to rewrite its own code.

3. The method of claim 1 wherein emulating the target system with the host system includes determining whether target system code underlying one or more fragments is unchanged, executing the one or more fragments if the target system code underlying the one or more fragments is unchanged, or stopping execution of the one or more of the processors and returning to the main translation function before executing one or more fragments if it is not determined that the target system code underlying the one or more fragments is unchanged.

4. The method of claim 3 wherein implementing the main translation function further includes determining whether the one or more fragments require updating, retranslating the one or more fragments to generate retranslated fragments.

5. The method of claim 4, further comprising executing the retranslated fragments with the host system.

6. The method of claim 3, wherein determining whether the target system code underlying the one or more fragments is unchanged includes determining whether the one or more fragments include previously un-executed code or a jump to an instruction knot known to be a start or end of a fragment.

7. The method of claim 1 wherein grouping two or more target system code instructions into one or more fragments includes analyzing target system instructions that are to be written into an instruction memory and isolating contiguous sequences of target system instructions to form the fragments.

8. An apparatus for emulating a target system on a host system having one or more processors, comprising:
   one or more processors coupled to a memory; and
   one or more processor executable instructions adapted to be executed by the one or more processors to emulate a target system, wherein the one or more processor executable instructions include:
   one or more instructions that, when executed group two or more target system code instructions for the target system into one or more fragments;
   one or more instructions that, when executed, translate each fragment into a corresponding set of position-independent instructions executable by the host system; and
   one or more instructions that, when executed load one or more fragments into the host system, determine if a memory layout for target system code corresponding to the one or more fragments has changed, dynamically re-link the one or more fragments without retranslating the one or more fragments based on changes to the memory layout to produce one or more re-linked fragments, and execute the re-linked fragments with the host system.

9. The apparatus of claim 8 wherein the one or more processors includes a processor that is unable to rewrite its own code.

10. An apparatus for emulating a target system on a host system having one or more processors, comprising:
    one or more processors coupled to a memory; and
    one or more processor executable instructions adapted to be executed by the one or more processors to emulate a target system having a main target processor, a secondary target processor element and an instruction memory associated with the secondary target processor element, wherein the one or more instructions include:

a) one or more instruction memory emulation instructions that, when executed, group two or more target system code instructions for the target system into one or more fragments;

b) one or more main translation instructions that, when executed, translate each fragment into a corresponding set of position-independent instructions executable by the host system; and c) one or more emulation instructions that, when executed, emulate the target system by loading one or more fragments into the host system, determine if a memory layout for target system code corresponding to the one or more fragments has changed, dynamically re-link the one or more fragments without retranslating the one or more fragments based on changes to the memory layout to produce one or more re-linked fragments, and execute the re-linked fragments on the host system.

11. The apparatus of claim 10 wherein emulation instructions include one or more instructions that, when executed, determine whether target system code underlying one or more fragments is unchanged, execute the one or more fragments if the target system code underlying the one or more fragments is unchanged, or stop execution of the one or more of the processors and return to the main translation instructions before executing one or more fragments if it is not determined that the target system code underlying the one or more fragments is unchanged.

12. The apparatus of claim 10 wherein the main translation instructions further include one or more instructions that, when executed, determine whether the one or more fragments require updating, retranslate the one or more fragments to generate retranslated fragments and returning to the emulation instructions to execute the retranslated fragments.

13. A non-transitory computer-readable medium having a set of computer readable instructions embodied therein, the computer-readable instructions being configured to implement a method for emulating a target system with a host system, the computer-readable instructions comprising:

a) one or more instructions that, when executed, group two or more target system code instructions for the target system into one or more fragments;

b) one or more instructions that, when executed, translate each fragment into a corresponding set of position-independent instructions executable by the host system; and c) one or more instructions that, when executed, emulate the target system by loading one or more fragments into the host system, determine if a memory layout for target system code corresponding to the one or more fragments has changed, dynamically re-link the one or more fragments without retranslating the one or more fragments based on changes to the memory layout to produce one or more re-linked fragments, and execute the re-linked fragments on the host system.

* * * * *